(12) United States Patent
Berenger

(10) Patent No.: US 7,482,709 B2
(45) Date of Patent: Jan. 27, 2009

(54) SYSTEM FOR POWERING AND CONTROLLING ELECTRICAL EQUIPMENT OF AN AIRCRAFT ENGINE OR ITS ENVIRONMENT

(75) Inventor: Serge Berenger, Chevilly Larue (FR)

(73) Assignee: Hispano-Suiza, Colombes (FR)

( * ) Notice: Subject to any disclaimer, the term of this patent is extended or adjusted under 35 U.S.C. 154(b) by 0 days.

(21) Appl. No.: 11/743,936

(22) Filed: May 3, 2007

(65) Prior Publication Data

US 2007/0259545 A1 Nov. 8, 2007

(30) Foreign Application Priority Data

May 5, 2006 (FR) .................................. 06 51637

(51) Int. Cl.
*H02J 5/00* (2006.01)
*H02J 1/10* (2006.01)
*H02J 9/00* (2006.01)

(52) U.S. Cl. .............................. 307/45; 307/23; 307/44

(58) Field of Classification Search .................. 307/23, 307/44, 45
See application file for complete search history.

(56) References Cited

U.S. PATENT DOCUMENTS 5,233,286 A 8/1993 Rozman et al.
5,297,015 A * 3/1994 Miyazaki et al. ............ 363/146
5,625,546 A * 4/1997 Schaal ........................ 363/71
6,704,625 B2 * 3/2004 Albero et al. ................. 701/3
7,121,905 B2 * 10/2006 Rzadki ......................... 440/3
7,286,910 B2 * 10/2007 Marin-Martinod et al. ..... 701/3

FOREIGN PATENT DOCUMENTS

| DE | 2 319 319 | 10/1974 |
| DE | 39 16 388 A1 | 12/1989 |
| EP | 0 409 226 A2 | 1/1991 |
| JP | 3-265430 | 11/1991 |
| WO | WO 02/058206 A1 | 7/2002 |

* cited by examiner

*Primary Examiner*—Stephen W Jackson
*Assistant Examiner*—Hal I Kaplan
(74) *Attorney, Agent, or Firm*—Oblon, Spivak, McClelland, Maier & Neustadt, P.C.

(57) ABSTRACT

A system for powering and controlling electrical equipment of an aircraft engine or of its environment, includes at least one DC voltage power supply bus, a set of power supply modules associated with an electrical equipment group, each module including a voltage converter and a selector circuit inserted between the outputs from the modules of the set of modules and the pieces of equipment of the equipment group. The modules and the selector circuit are controlled to activate each piece of equipment of the equipment group by connecting it to at least one of the modules, with an emergency module being put into operation in the event of one of the other modules failing.

13 Claims, 6 Drawing Sheets

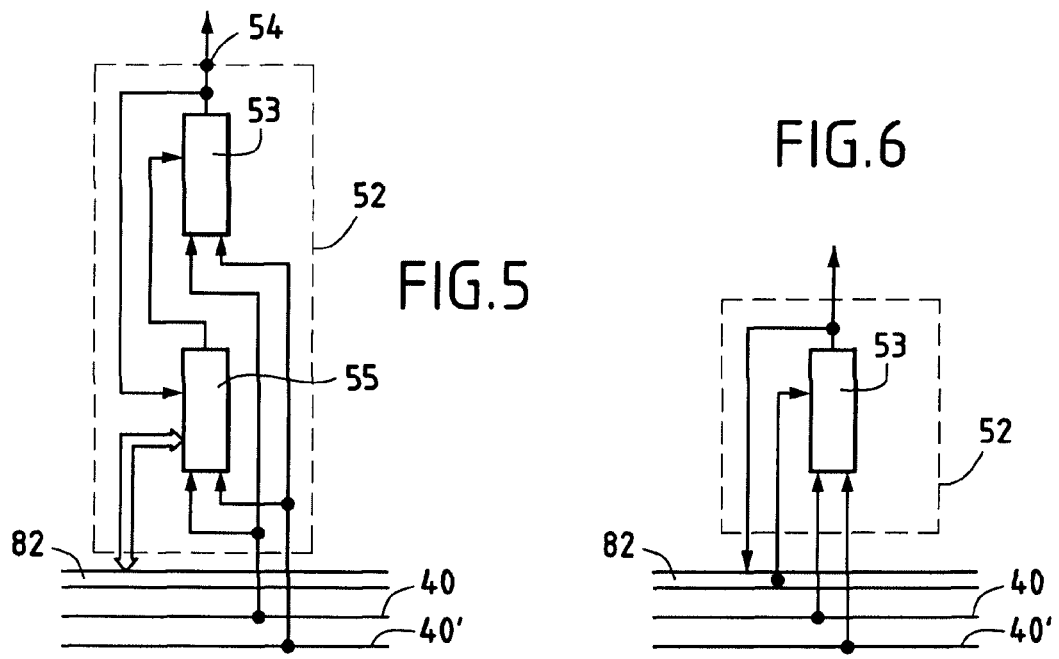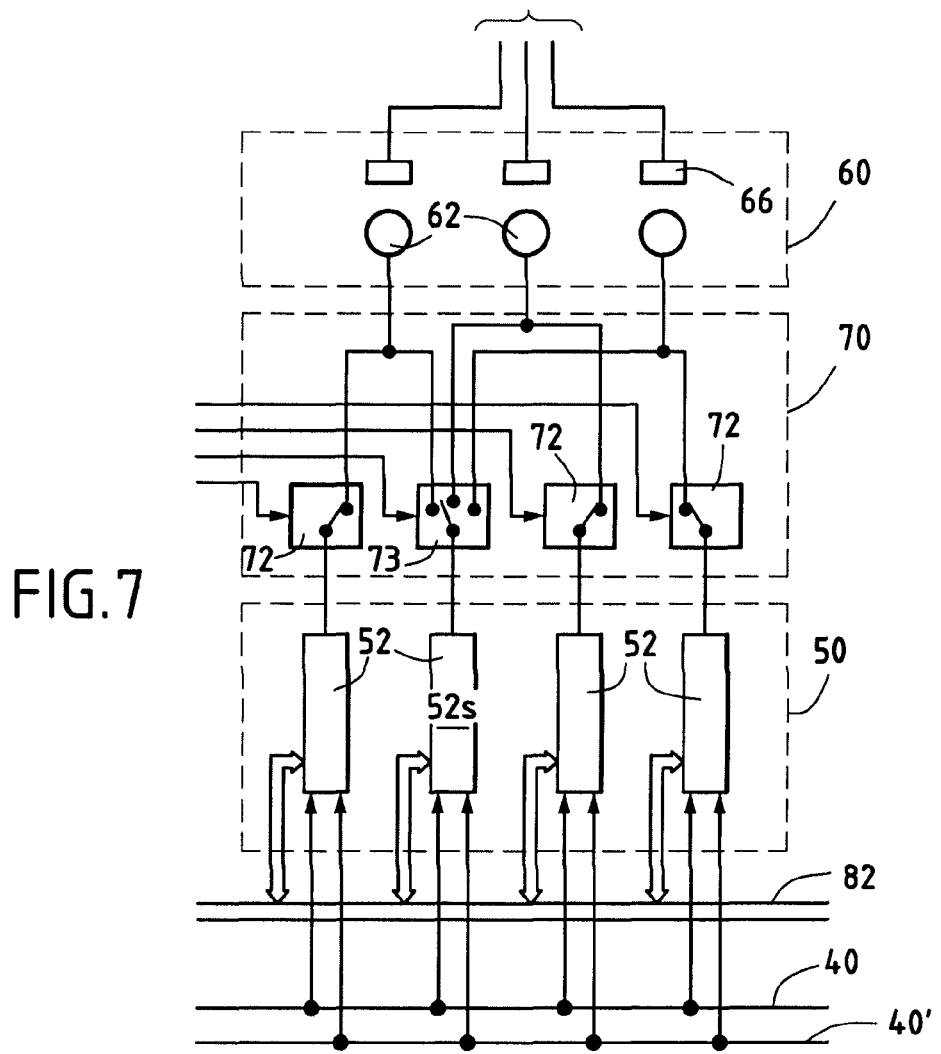

SYSTEM FOR POWERING AND CONTROLLING ELECTRICAL EQUIPMENT OF AN AIRCRAFT ENGINE OR ITS ENVIRONMENT

BACKGROUND OF THE INVENTION

The invention relates to electrically powering and controlling electrical equipment of an aircraft engine and/or of its environment.

The field of application of the invention is more particularly that of airplane engines, in particular gas turbine engines. Nevertheless, the invention is also applicable to helicopter engines.

The term "electrical equipment of an aircraft engine or of its environment" is used herein to cover not only electrical equipment useful for the actual operation of the engine, but also electrical equipment associated with the engine pod, such as, for example: de-icing or anti-icing electrical circuits; electromechanical actuators for thrust reversers for a gas turbine airplane engine; or even equipment associated with the wing carrying the engine, such as, for example: electrical de-icing or anti-icing circuits of an airplane wing.

A traditional layout for producing and distributing electricity from a gas turbine airplane engine is shown in FIG. 1.

Two generators 1, 1' (or more than two for redundancy purposes or for optimizing the generation of electrical power depending on the application in question) are mounted on an accessory gearbox (AGB) that is mechanically coupled to a turbine shaft of the engine. The generators are typically starter/generators (S/Gs) comprising a synchronous generator that is associated with an exciter and that supplies an alternating voltage at a frequency that varies as a function of the speed of the engine, the assembly comprising the exciter and the synchronous generator being controlled to operate in synchronous motor mode when starting the turbine.

The alternating voltages supplied by the generators 1, 1' are conveyed by lines 2, 2' to an electrical power distribution network 3 on board the airplane, referred to as the "on-board network". A circuit 4 of the on-board network connected to the lines 2, 2' supplies a regulated alternating voltage typically of 115 volts AC (Vac) or 230 Vac, on one or more distribution buses. The circuit 4 also powers a voltage converter 5 that delivers a regulated direct current (DC) voltage, typically 270 Vdc or ±270 Vdc, on one or more buses. The voltages supplied by the circuits 4 and 5 are fed to the various electrical loads on board the airplane, mainly in the fuselage zone.

In the engine, an electronic engine control unit 6 (ECU) is powered by a generator 7 such as a permanent magnet alternator (PMA) mounted on the accessory gearbox (AGB). The ECU is also connected to one of the buses 4, 5, e.g. to the regulated alternating voltage bus 4 in order to be powered properly so long as the speed of the engine is not sufficiently fast to enable the PMA to supply the required electrical power, or in the event of the PMA failing. The ECU uses the electricity it receives to enable its components to operate and to excite the various elements of the engine that require limited amounts of electrical power such as probes or sensors, actuators, or servo-valves.

There is a present trend to replace hydraulic power more and more with electrical power for actuating various pieces of equipment in an aircraft engine or its environment. Thus, some airplanes are fitted with thrust reversers that are electrically actuated, such that an electrical power supply line 8 must connect the on-board network 3 of the airplane to such an electric thrust reverser 9. Such a line is in addition to those needed for powering static equipment, such as lines 10, 11 for powering de-icing circuits 12, 13 of the engine pod and of the wing carrying the engine.

There exists a need for a system that is simple and safe and that enables an increasing amount of electrical equipment of an engine and its environment to be activated without increasing connections between the airplane on-board network and the electrical equipment concerned.

OBJECT AND SUMMARY OF THE INVENTION

To this end, the invention provides a system for powering and controlling electrical equipment of an aircraft engine and/or of its environment, the system comprising:

- at least one DC voltage power supply bus;
- at least one set of power supply modules connected in parallel to the power supply bus, said set being associated with a respective group of pieces of electrical equipment, the number of modules of the set being greater than the minimum number needed to activate the electrical equipment of the group so as to provide at least one emergency module, each module comprising a voltage converter for supplying an alternating voltage at the output from the module and derived from the DC voltage of the power supply bus;
- a selector circuit inserted between the outputs of the modules of the set of modules and the pieces of equipment of the equipment group; and
- an arrangement for controlling the modules and the selector circuit to activate each piece of equipment of the equipment group by connecting it to at least one of the modules, and to put an emergency module into service in the event of a failure being detected in one of the other modules.

In an embodiment, the control device comprises a central control unit and processor units integrated respectively in the various modules to control the supply of alternative voltage by a module to a piece of electrical equipment powered by said module as a function of information transmitted by the central control unit. The control information transmitted by the central control unit may be conveyed by a bus to which the processor units of the modules are connected. The, or each, emergency module may be configurable to be adapted to any of the pieces of equipment to which it might be connected, by the central control unit changing an application program in the processor unit of the emergency module.

In another embodiment, the control device comprises a central control unit connected to the various modules to cause alternating voltage to be supplied by a module to a piece of electrical equipment to which it is connected as a function of information received from the central control unit.

According to a feature of the system, the central control unit is connected to sensors associated with pieces of equipment of the equipment group to control the supply of alternating voltage by a module as a function of information received from at least one sensor associated with the equipment to which the module is connected and/or as a function of information received from an electronic control unit of the engine.

In a first variant embodiment, the output from an emergency module is connected to a selector unit of the selector circuit, which selector unit has a first state that is inactive in which the output from the emergency module is not connected to any equipment, and other states that are active and in each of which the output from the emergency module is connected to one piece of equipment selected from a plurality of pieces of equipment of the equipment group. The selector unit may enable an emergency module to be connected to any one of the pieces of equipment of the equipment group.

In a second variant embodiment, the output from an emergency module is connected to a selector unit of the selector circuit, which selector unit has a first state that is active and in which the output from the emergency module is connected to a first piece of equipment in parallel with the output of another module, and at least one second state that is active and in which the output from the emergency module is connected to a piece of equipment other than the first piece of equipment.

In yet another variant embodiment, the selector circuit comprises at least one selector unit enabling the output of a module to be connected selectively to one of out of a plurality of pieces of equipment that do not need to be activated simultaneously.

BRIEF DESCRIPTION OF THE DRAWINGS

The invention can be better understood on reading the following description given by way of non-limiting indication and with reference to the accompanying drawings, in which:

FIG. 5 is a diagrammatic view of a power supply module in an embodiment of the FIG. 4 system;

FIG. 6 is a diagrammatic view of another embodiment of a power supply module for the FIG. 4 system; and FIGS. 7 to 9 show different configurations for associating a set of power supply modules with a group of pieces of electrical equipment in a system of the kind shown in FIG. 4.

DETAILED DESCRIPTION OF EMBODIMENTS OF THE INVENTION

Figure 1:
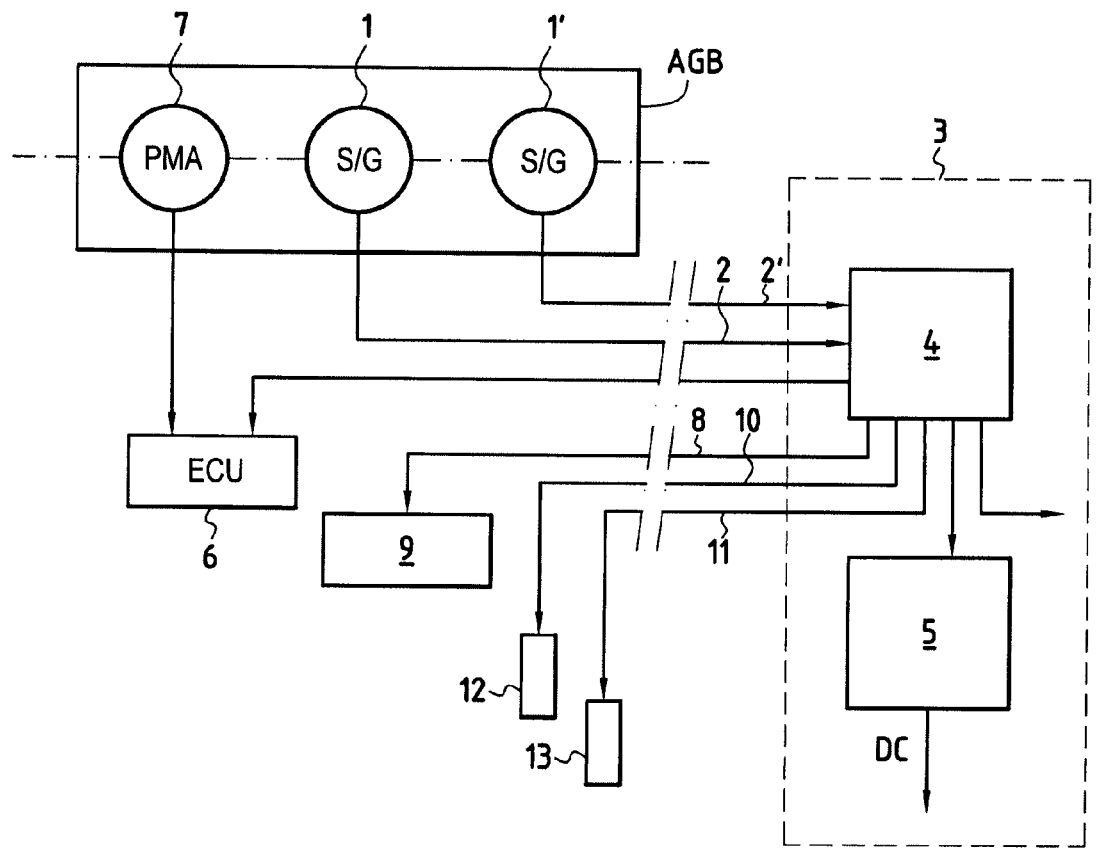
FIG. 1, described above, is a highly diagrammatic representation of a known layout for producing and distributing electrical power in an aircraft.
Figure 2:
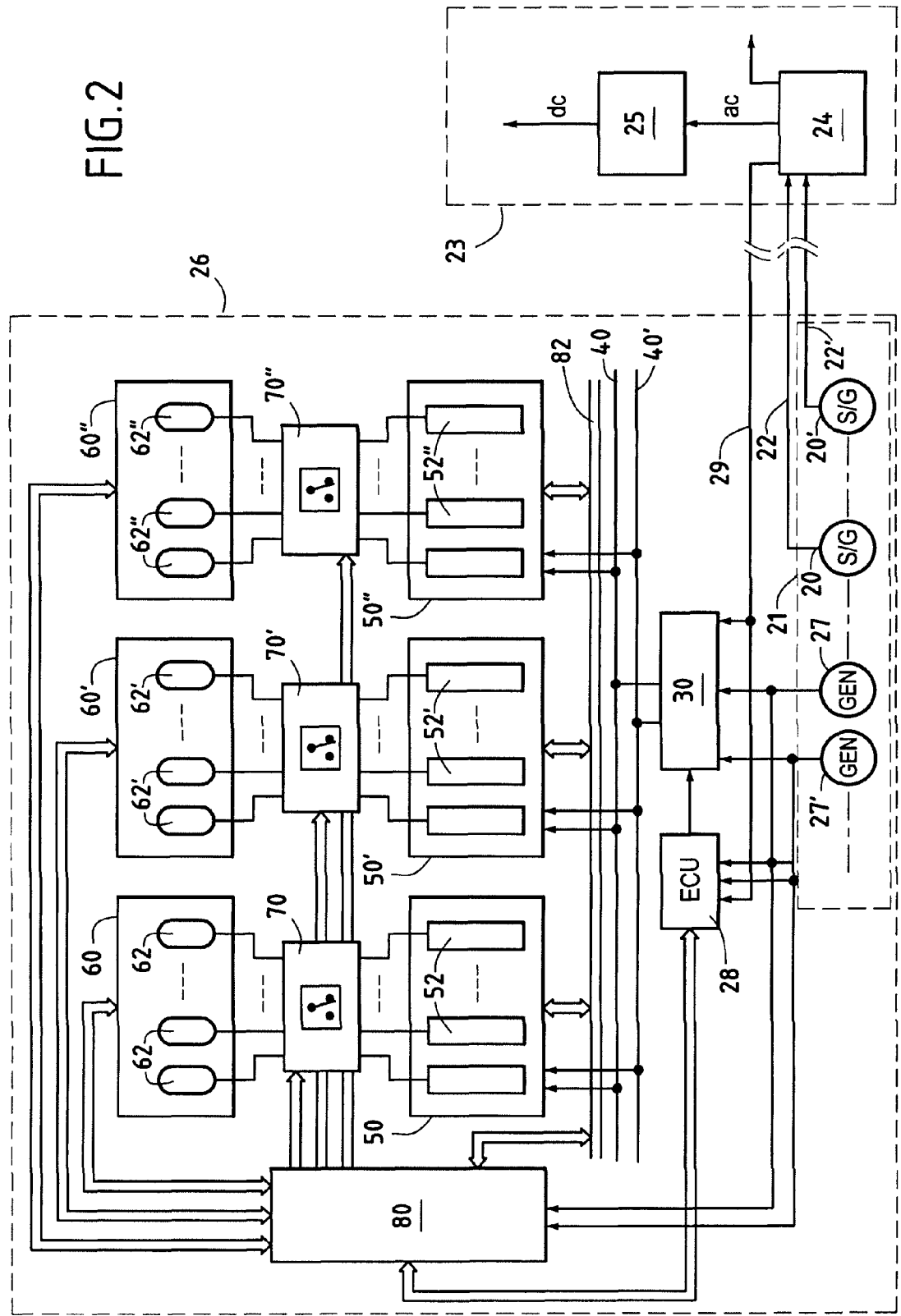
FIG. 2 is a highly diagrammatic general view of a circuit for electrically powering and controlling equipment of an aircraft engine and its environment.

FIG. 2 shows a general layout of a circuit for electrically powering and controlling electrical equipment of an aircraft engine and its environment, in particular a gas turbine airplane engine.

In conventional manner, the circuit of FIG. 2 comprises one or two generators 20, 20' such as S/Gs mounted on an AGB (shown at 21) that is mechanically coupled to a turbine shaft of the engine. The alternating voltages supplied by the S/Gs 20 and 20' are conveyed by lines 22 and 22' to an electrical power distribution network 23 on board the airplane, or an on-board network. A circuit 24 of the on-board network delivers a regulated alternating voltage on one or more distribution buses, typically at 115 Vac or 230 Vac, at a frequency that varies as a function of the speed of rotation of the turbine shaft. The circuit 24 also powers a voltage converter circuit 25 that supplies a regulated DC voltage, typically 270 Vdc or ±270 Vdc on one or more buses. The voltages produced by the circuits 24 and 25 power various loads in the fuselage zone of the airplane.

At the engine (represented by 26), generators GEN 27, 27' (such as for example PMAs) distinct from the generators 20, 20' and mounted on the AGB 21 supply AC to an electronic control unit (ECU) 28 of the engine, and to a secure power supply circuit 30 forming part of an electrical power distribution network integrated in the engine. The ECU 28 and the power supply circuit 30 are also connected to the AC circuit 24 by a line 29 so as to be capable of being fed properly so long as the speed of the engine is not sufficient to ensure that sufficient electrical power is supplied by the generators 27, 27'.

The power supply circuit 30 supplies a DC voltage that is not necessarily regulated, but that includes in its nominal range the DC voltage of the on-board network, e.g. 270 Vdc or ±270 Vdc. This DC voltage is supplied on two DC distribution buses such as the buses HVDC 40, 40' that power a system for powering and controlling electrical equipment of the engine and/or of its environment. The power supply and control system includes power supply modules which, in the example shown, are subdivided into a plurality of sets 50, 50', 50" associated with respective groups 60, 60', 60" of pieces of electrical equipment 62, 62', 62" via respective selector circuits 70, 70', 70".

The electrical equipment comprises in particular electric motors for pumps, actuators for variable-geometry parts of the airplane engine or for thrust reversers or for electrically actuated inspection hatches, and de-icing or anti-icing resistive circuits, with all such equipment forming part of the airplane engine of its environment (engine pod, engine support system, and nearby wing).

The power supply modules 52, 52', and 52" of the sets 50, 50', 50", and the selector circuits 70, 70', 70" are controlled by a control device comprising a central control unit 80. This is connected by sets of lines 64, 64', 64" to sensors 66, 66', 66" associated with at least some of the pieces of electrical equipment in the groups 60, 60', 60", and it is also connected to the ECU 28. The components of the central control unit 80 are powered in the same manner as the components of the ECU 28. The power supply modules 52, 52', 52" comprise inverters for delivering an AC voltage to the pieces of equipment 62, 62', 62" of the groups 60, 60', 60" that is obtained from the DC voltage delivered by the buses 40, 40' to which the power supply modules 52, 52', 52" are connected in parallel. The central control unit 80 controls the modules 52, 52', 52" and the selector circuits 70, 70', 70" to activate each of the pieces of equipment 62, 62', 62" as a function of information received by the ECU 28 and/or sensors associated with the pieces of equipment. The term "activating" is used herein with respect to a piece of equipment, in particular to indicate that an electric motor is being driven, an electric or an electromechanical actuator is set into movement, or indeed that a resistive heater circuit is powered.

The power supply modules of each set are similar, with the modules being subdivided into different sets and the pieces of equipment being grouped into different groups as a function of power requirements in order to optimize the sizes of the inverters of the power supply modules. The number of sets of modules and the number of groups of pieces of equipment is three in the example described. Naturally, it could be other than three, or even equal to one if the inverters are capable of powering all of the equipment. As described below in detail, each set of modules includes at least one emergency module for redundancy purposes. The selector circuits 70, 70', 70" are controlled to connect each piece of equipment of a group to a module of the set corresponding to said group, and possibly the emergency module, should that be necessary.

Figure 3:
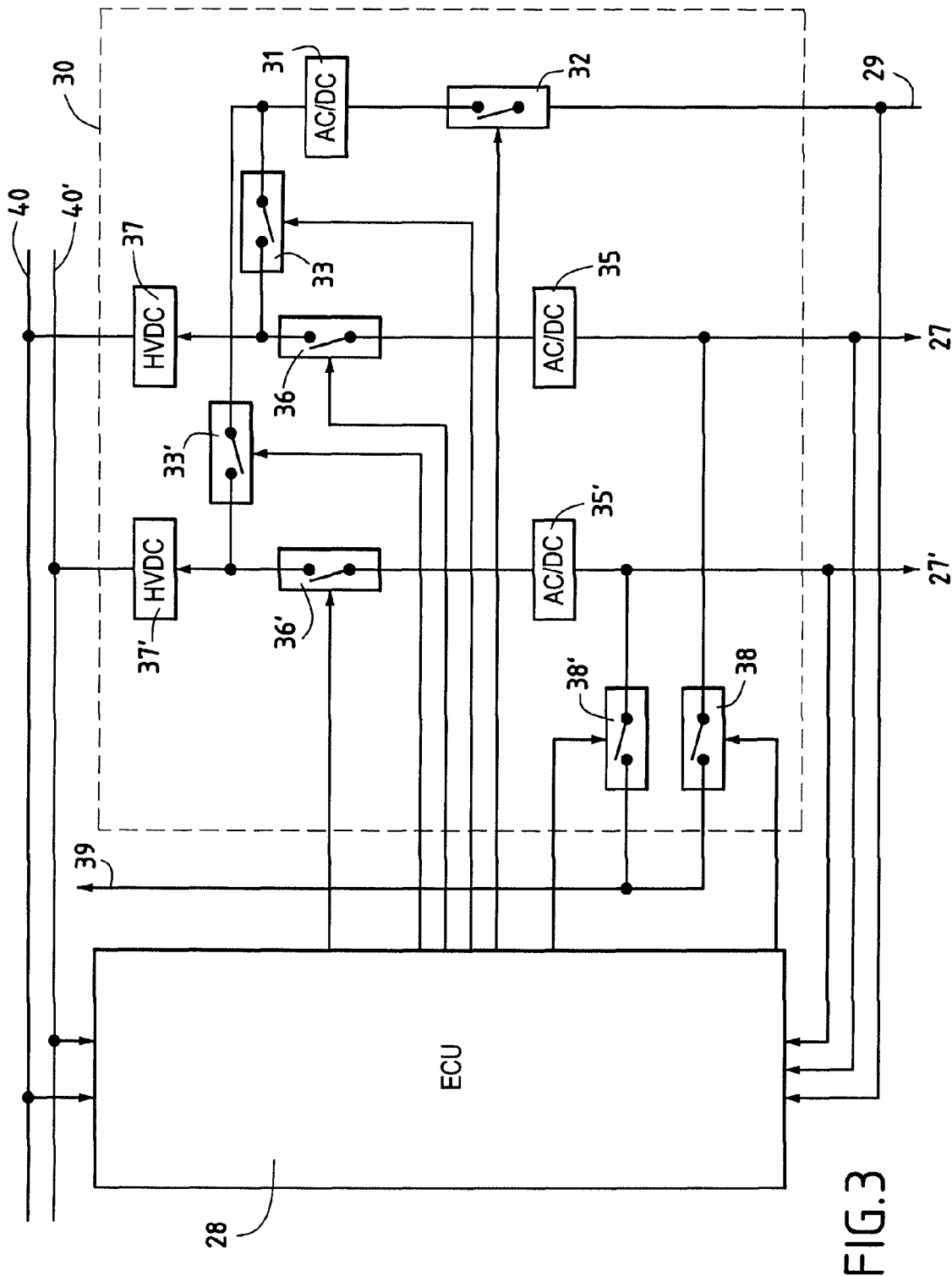
FIG. 3 is a more detailed view of a voltage power supply circuit forming part of the FIG. 2 circuit.

FIG. 3 shows in greater detail the secure power supply circuit 30. The AC/DC converter circuit 31 has its input connected by a switch 32 to a first input of the circuit 30 connected to the line 29. Two other AC/DC converter circuits 35, 35' have their inputs connected respectively to second and third inputs of the circuit 30 receiving the respective AC voltages from the generators 27 and 27'. The outputs from the converters 35, 35' are respectively connected via switches 36, 36' to DC bus circuits 37, 37', e.g. of the HVDC type respectively powering the buses 40 and 40'. The output from the converter 31 is also connected to the circuits 37, 37' via respective switches 33, 33'.

The selector circuit formed by the switches 32, 33, 33', 36, 36' is controlled by the ECU 28 as a function of the voltage levels detected at the outputs from the generators 27, 27'. When the generators supply sufficient electrical power, the switches 36, 36' are closed and the switches 32, 33, and 33' are open. The electricity available on the buses 40, 40' is taken from that supplied by the generators 27, 27', respectively. When one and/or the other of the generators 27, 27' is supplying insufficient power while the airplane engine is running slowly or in the event of failure, the switch 36 and/or the switch 36' is opened under the control of the ECU 28 and simultaneously the switch 32 and the switch 33 and/or the switch 33' are closed. The electricity available on the buses 40, 40' is then taken from that supplied by one of the generators 27, 27' and the line 29, or solely from that supplied by the line 29. The power supply circuit 30 thus provides a secure electrical power supply node at the engine. The buses 40, 40' power the sets of modules 50, 50', 50" and also the central control unit 80 for activating the electrical equipment 62, 62', 62". Nevertheless, it is possible to power one or more pieces of electrical equipment directly from the output of a generator 27, 27', e.g. a circuit for de-icing the pod of the engine or the wing connected to a line 39 that is in turn connected to the output of the generators 27, 27', by respective switches 38, 38'. The switches 38, 38' are controlled by the ECU 28 to power the line 39 as a function of requirements.

The use of two buses 40, 40' that are powered separately makes it possible to mitigate the failure of one bus or of its power supply, and to share the distributed DC electrical power.

The use of two generators 27, 27' serves to mitigate the failure of one generator, while conserving a power supply that is made secure by the connection 29 with the on-board network and to share the electrical power supplied. The use of a single generator powering both buses 40, 40' in parallel can nevertheless be envisaged. It is also possible to envisage having only one power supply bus that is powered in parallel from two generators or from a single generator, and where appropriate from the on-board network.

In addition, the voltage of the on-board network received by the secure power supply circuit could be a DC voltage. AC/DC conversion of this voltage at the circuit 30 is then no longer necessary, such that the converter 31 can be omitted or replaced, where necessary, by a DC/DC converter.

Figure 4:
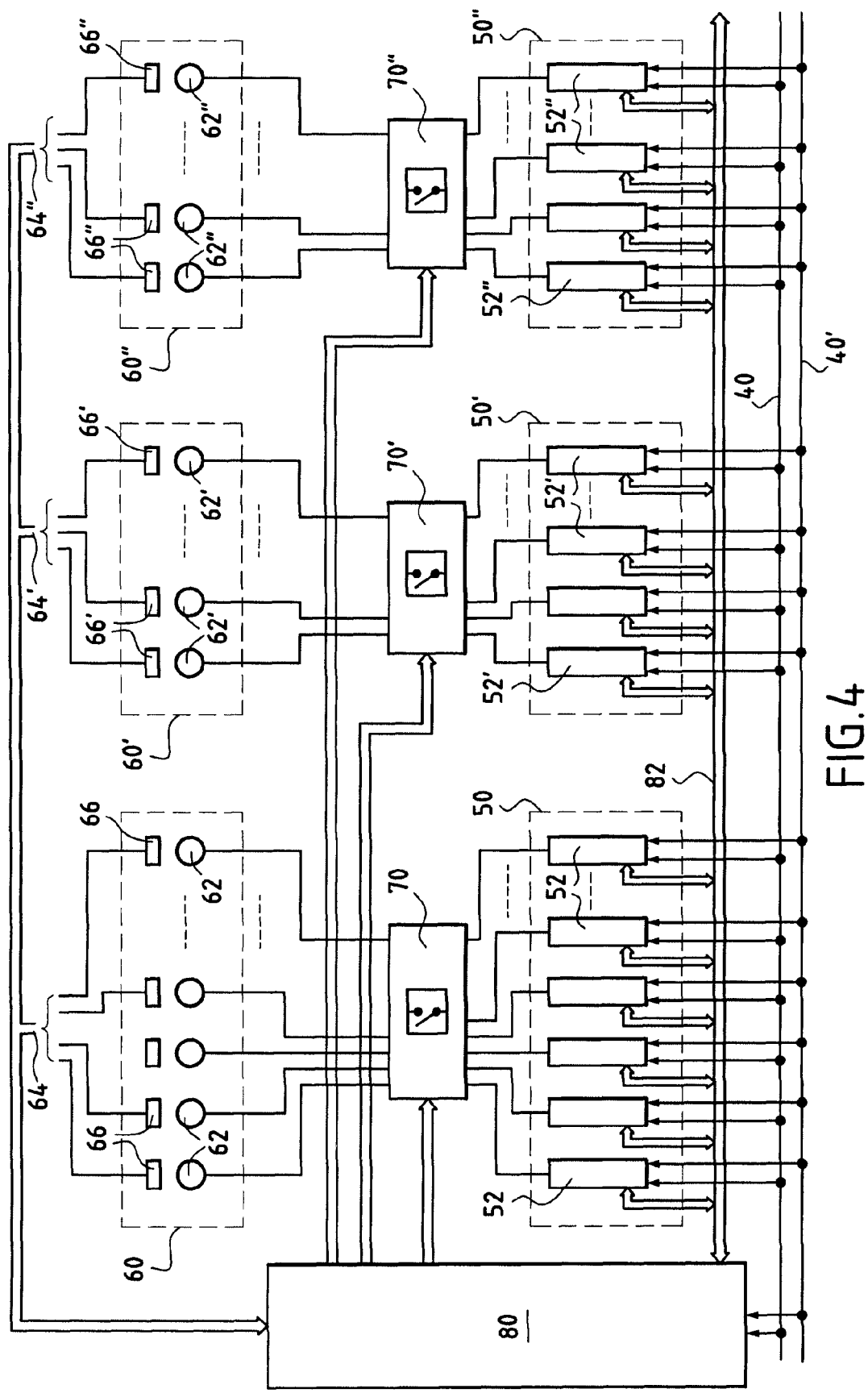
FIG. 4 is a more detailed view of a system for activating electrical equipment forming part of the FIG. 2 circuit, according to an embodiment of the invention.

FIG. 4 shows in greater detail the circuit for activating and powering the electrical equipment 62, 62', 62" from DC power supply buses 40, 40'.

The electrical equipment may comprise in particular:

actuators for variable-geometry parts of the gas turbine engines, such as variable bleed valves (VBVs) for the compressor, members for setting variable stator vanes (VSVs) of stator stages of the compressor, transient bleed valves (TBVs) of the compressor that are operated during particular stages of flight, in particular during takeoff, or indeed members for varying the clearance at the tips of the blades of the turbine rotor (clearance between the blade tips and the turbine casing) for low pressure turbine active clearance control (LPTACC) or for high pressure turbine active clearance control (HPTACC);

members of the fuel feed circuit, such as high pressure fuel pump motors, low pressure fuel pump motors, and flow rate control valves;

lubrication circuit members, such as feed pump motors, air/lubricant separator arrangements (breathers), or scavenger pumps (SCAV); and electrical loads in the engine pod such as electromechanical actuators for electric thrust reverser actuating systems (ETRAS), electromechanical actuators for inspection or maintenance hatches.

Some pieces of equipment require lower levels of electrical power than others. As mentioned above, the equipment may be subdivided into a plurality of groups as a function of power requirements. In the presently described example, the equipment is subdivided into three equipment groups 60, 60', 60" corresponding to three distinct power levels:

Group 60: low power for pieces of equipment 62 such as VBV, VSV, TBV, LPTACC, HPTACC variable-geometry units, a feed or recovery pump of the lubrication circuit, or an actuator for an inspection or maintenance hatch in the pod, . . . .

Group 60': medium power for equipment 62' such as a fuel flow rate control valve actuator, an air/lubricant separator arrangement, . . . .

Group 60": high power for the equipment 62" such as a high or low pressure pump motor of the fuel circuit, a thrust reverser actuator, a circuit for de-icing or anti-icing the pod, . . . .

Sensors 66, 66', 66" such as for example state sensors, position sensors (e.g. end-of-stroke sensors), flow rate sensors, temperature sensors are associated with at least some of the pieces of equipment and are connected to the central control unit 80 via lines 64, 64', 64".

In the embodiment of FIGS. 4 and 5, each module 52, 52', 52" of a set of modules 50, 50', 50", e.g. a module 52 (FIG. 5), includes an inverter 53 connected to the buses 40, 40' in order to deliver an alternating voltage on the output 54 of the module, the inverter being adapted to deliver the desired power level. The module 52 further comprises a processor unit 55 that is powered by the buses 40, 40' and that is connected to the central control unit 80 by a bus 82. The processor unit 55 controls the operation of the inverter 53 and it is connected to the output therefrom in order to servo-control the operation of the inverter.

The processor unit 55 controls the operation of the inverter 53 to activate equipment to which the inverter is connected via a selector circuit 70 as a function of control information received from the central control unit 80. The control information is generated on the basis of information received from one or more sensors associated with the equipment to be activated and/or from the ECU 28.

The central control unit 80 also receives information from the processor unit 55 concerning proper operation of the inverter 53 so that in the event of a failure being detected, the selector circuit 70 is controlled to connect the equipment for activation to a spare module or emergency module forming part of the set 50, as described below.

In a variant, it is possible to transmit over the bus 82 the information received from the sensors and from the ECU 28, the processor unit 55 being programmed to control the operation of the inverter 53 as a function of said information so as to activate the associated electrical equipment via the selector circuit 70. Under such circumstances, if a module 62 fails, an emergency module of the set 60 can be configured by the central control unit 80 downloading thereto the application program corresponding to the equipment to which the emergency module is to be connected, the circuit 70 being controlled to interrupt the connection between the equipment in question and the failed module and to set up the connection between said equipment and the emergency module.

It should be observed that the central control unit 80 could be integrated in the ECU 28.

FIG. 6 shows a variant embodiment in which the modules 52, 52', 52", e.g. a module 52, essentially comprise the inverter 53 which is controlled over a dedicated link from the central control unit and supplying thereto over another dedicated link information about the output voltage from the inverter.

FIG. 7 shows an embodiment of a set 50, 50', 50" of modules, e.g. a set 50 associated with an equipment group 60 via a selector circuit 70. The set 50 comprises modules 52 in a greater number than the number of pieces of equipment 62 in the corresponding group 60, so as to provide at least one emergency module 52s similar to the other modules. In the example shown and in order to simplify the drawings, there can be seen a group of three pieces of equipment only, where the number of modules is equal to four. Depending on the total number of modules in the set 50, it is possible to provide more than one emergency module.

In normal operation, the equipment 62 is connected to respective modules 52 via the switches 72 of the circuit 70, which switches are then closed. The emergency module 52s is connected to a selector 73 of the circuit 70 via which it can be connected to any one of the pieces of equipment 62. The switches 72 and the selector 73 are controlled by the central control unit 80 via dedicated control lines.

In the event of a fault being detected in one of the modules 52, the emergency module 52s is activated and the central unit 80 acts firstly to open the switch 72 connecting the failed module to the associated equipment 62, and secondly to cause that equipment to be connected to the emergency module 52s via the selector 73.

Figure 8:
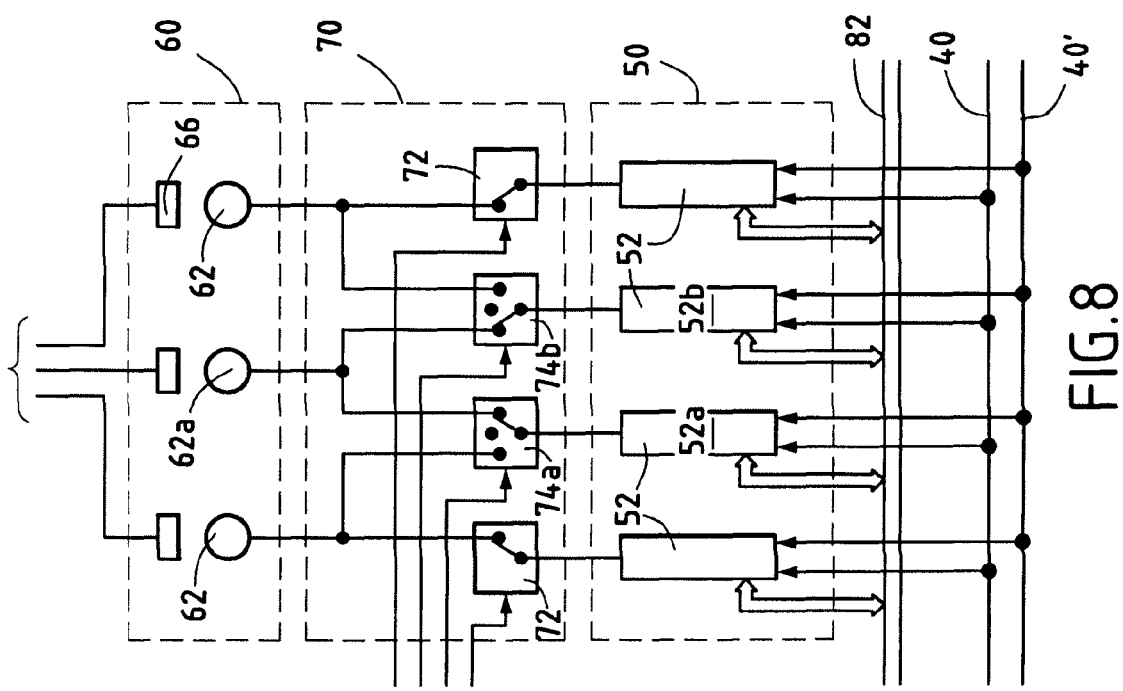

FIG. 8 shows another embodiment of a set 50, 50', or 50" of modules, e.g. a set 50 associated with an equipment group 60 via a selector circuit 70. The set 50 comprises a number of modules 52 that is greater than the number of pieces of equipment 62 in the corresponding group, one of the pieces of equipment 62a in normal operation being powered in parallel by two modules 52a, 52b via selectors 74a, 74b of the selector circuit 70. The other pieces of equipment are connected to other respective modules via the switches 72. The switches 72 and the selectors 74a, 74b are controlled by the control unit 80 by means of dedicated line. Where appropriate, the selectors 74a, 74b enable the module 52a or the module 52b to be connected to a piece of equipment other than the piece of equipment 62a, thereby enabling each module 52a, 52b to act as an emergency module.

In the event of failure being detected in a module 52 other than the modules 52a, 52b, the central unit 80 causes the selector 74a or 74b to connect the module 52a or 52b to the piece of equipment associated with the failed module and causes the switch 72 connecting the failed module to the associated piece of equipment to open. In the event of a failure being detected in one of the modules 52a, 52b, the central unit 80 causes the associated selector 74a or 74b to isolate the output from the failed module.

Thus, in emergency mode, the equipment 62a is powered by only one of the modules 52a, 52b. This embodiment can thus be envisaged when a degraded mode of operation is possible with the equipment 62a being powered at reduced power.

Figure 9:
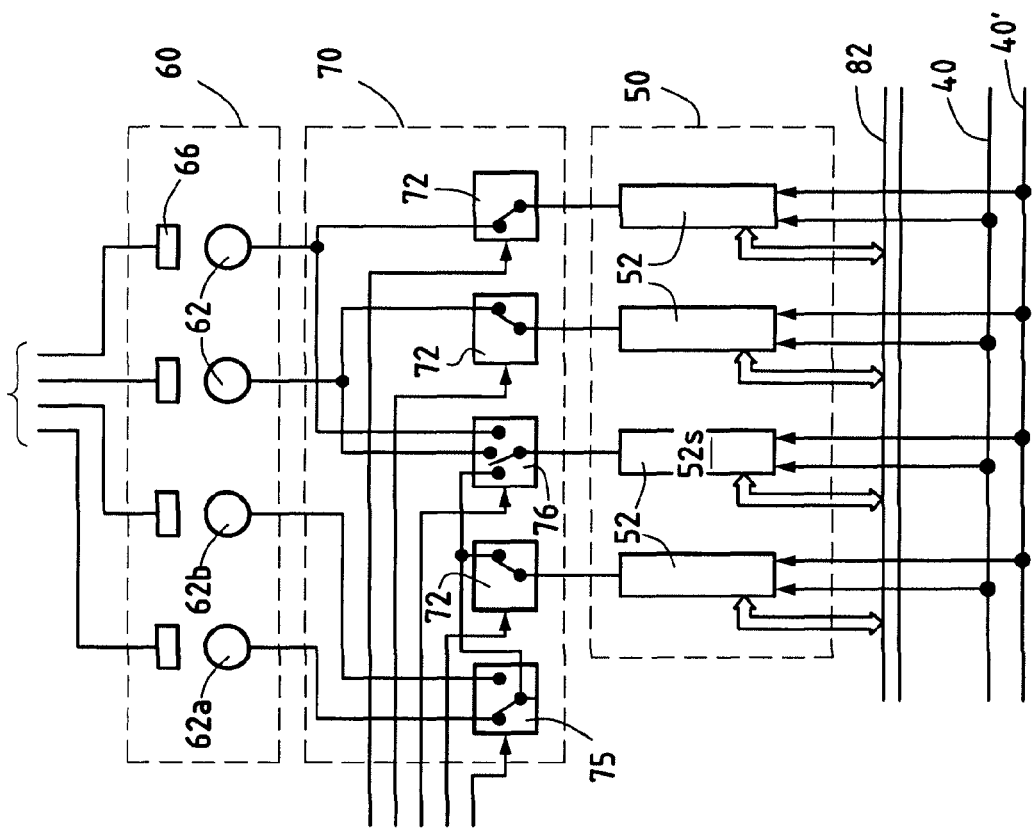

FIG. 9 shows yet another embodiment of a set 50, 50', or 50" of modules, e.g. a set 50 associated with an equipment group 60 via a selector circuit 70. This embodiment is appropriate when two pieces of equipment 62a, 62b are never activated simultaneously and can be connected via a selector 75 to a single power supply module. This can apply for example to thrust reverser actuators and actuators for inspection and maintenance hatches.

In the embodiment of FIG. 9, the number of modules 52 may be equal to or even less than the number of the pieces of equipment 62, while still having an emergency module 52s. Thus, one of the modules 52 other than the emergency module is normally connected to the selector 75 via a switch 72 while the other modules 52 other than the emergency module are connected to the other pieces of equipment 62 via respective switches 72. The emergency module 52s is connected to a selector 76 enabling it to be connected to the selector 75 or to pieces of equipment 62 other than the pieces of equipment 62a, 62b. The switches 72 and the selectors 75, 76 are controlled by the central control unit 80 via dedicated control lines.

In the event of a failure being detected in one of the modules 52, the central unit 80 causes the emergency module 52s to be activated, causes the switch 72 associated with the failed module to open, and causes the selector 76 to connect the emergency module to the selector 75 or to the equipment 62 associated with the failed module.

Thus, secure activation of an equipment group is achieved by sharing resources constituted by a set of similar power supply modules, while limiting the number of modules needed since securing the activation of equipment in any one group does not require two power supply modules to be associated with each piece of equipment for redundancy purposes.

In the embodiments described above, the power supply modules are associated in operation with respective pieces of equipment, and only the or each emergency module can be associated with different pieces of equipment. It is possible to envisage a higher degree of modularity, without certain modules being individualized, each power supply module being suitable for being associated with one piece of equipment amongst several. The allocation of a module to a piece of equipment is then controlled by the central control unit by acting on the selector circuit and by assigning a special function to the power supply module, for example, as described, by downloading an application program into a processor unit of the module.

Although the description above relates to an embodiment of a power supply circuit 30 associated with the engine for delivering DC on the buses 40, 40', it is possible to envisage powering these buses directly from a regulated voltage of the on-board network.

What is claimed is:

1. A system for powering and controlling electrical equipment of an aircraft engine or of an environment of said aircraft engine, the system comprising:
   at least one DC voltage power supply bus;
   at least one set of power supply modules connected in parallel to the power supply bus, said set being associated with a respective group of pieces of electrical equipment for said aircraft engine or for said environment of said aircraft engine, the number of modules of the set being greater than the minimum number needed to activate the electrical equipment of the group so as to provide at least one emergency module, each module comprising a voltage converter for supplying an alternating voltage at the output from the module and derived from the DC voltage of the power supply bus;

a selector circuit inserted between the outputs of the modules of the set of modules and the pieces of equipment of the equipment group; and a control device for controlling the modules and the selector circuit to activate each piece of equipment of the equipment group by connecting it to at least one of the modules, and to put an emergency module into service in the event of a failure being detected in one of the other modules, wherein the control device comprises a central control unit and processor units integrated respectively in the various modules to control the supply of alternative voltage by a module to a piece of electrical equipment powered by said module as a function of information transmitted by the central control unit, and wherein the or each emergency module is configurable to be adapted to any of the equipment to which it might be connected, by the central control unit changing an application program in the processor unit of the emergency module.

2. A system according to claim 1, in which the central control unit is connected to sensors associated with pieces of equipment of the equipment group to control the supply of alternating voltage by a module as a function of information received from at least one sensor associated with the equipment to which the module is connected and/or as a function of information received from an electronic control unit of the engine.

3. A system according to claim 1, in which the output from an emergency module is connected to a selector unit of the selector circuit, which selector unit has a first state that is inactive in which the output from the emergency module is not connected to any equipment, and other states that are active and in each of which the output from the emergency module is connected to one piece of equipment selected from a plurality of pieces of equipment of the equipment group.

4. A system according to claim 3, in which the selector unit enables an emergency module to be connected to any one of the pieces of equipment of the equipment group.

5. A system according to claim 1, in which the output from an emergency module is connected to a selector unit of the selector circuit, which selector unit has a first state that is active and in which the output from the emergency module is connected to a first piece of equipment in parallel with the output of another module, and at least one second state that is active and in which the output from the emergency module is connected to a piece of equipment other than the first piece of equipment.

6. A system according to claim 1, wherein the selector circuit comprises at least one selector unit enabling the output of a module to be connected selectively to one of a plurality of pieces of equipment that do not need to be activated simultaneously.

7. A system according to claim 1, wherein the control device comprises a central control unit and processor units integrated respectively in the various modules to control the supply of alternating voltage by a module to a piece of electrical equipment powered by said module as a function of information transmitted by the central control unit.

8. A system according to claim 7, wherein the control information transmitted by the central control unit is conveyed by a bus to which the processor units of the modules are connected.

9. A system according to claim 1, wherein said pieces of electrical equipment for said aircraft engine or for said aircraft engine environment includes at least one of an actuator for said aircraft engine, for thrust reversers, or for an inspection hatch.

10. A system according to claim 9, wherein said pieces of electrical equipment for said aircraft engine or for said aircraft engine environment includes at least an electric motor or a pump.

11. A system according to claim 9, wherein said pieces of electrical equipment for said aircraft engine or for said aircraft engine environment includes at least one of de-icing or anti-icing resistive circuits.

12. A system for powering and controlling electrical equipment of an aircraft engine or of an environment of said aircraft engine, the system comprising:

at least one DC voltage power supply bus;

at least one set of power supply modules connected in parallel to the power supply bus, said set being associated with a respective group of pieces of electrical equipment for said aircraft engine or for said environment of said aircraft engine, the number of modules of the set being greater than the minimum number needed to activate the electrical equipment of the group so as to provide at least one emergency module, each module comprising a voltage converter for supplying an alternating voltage at the output from the module and derived from the DC voltage of the power supply bus;

a selector circuit inserted between the outputs of the modules of the set of modules and the pieces of equipment of the equipment group;

a control device for controlling the modules and the selector circuit to activate each piece of equipment of the equipment group by connecting it to at least one of the modules, and to put an emergency module into service in the event of a failure being detected in one of the other modules; and a secure power supply circuit that supplies a DC voltage to said DC voltage power supply bus, wherein said secure power supply circuit has at least two AC/DC converters, one of said AC/DC converters being configured to receive, from a distribution network onboard said aircraft, an alternating voltage at a frequency that varies as a function of a speed of rotation of a turbine shaft of said aircraft engine, and another one of said AC/DC converters receiving an alternating voltage from another generator mounted on said aircraft engine.

13. A system according to claim 12, wherein said secure power supply circuit further comprises switches configured to switch, when said generator mounted on said aircraft engine is supplying insufficient power, from said generator mounted on said aircraft engine to said distribution network onboard said aircraft, for supplying said DC voltage power supply bus.

* * * * *